(12) United States Patent
Yamaguchi et al.

(10) Patent No.: US 7,339,867 B2
(45) Date of Patent: Mar. 4, 2008

(54) DEFECT-SIGNAL GENERATING CIRCUIT AND OPTICAL DISK REPRODUCING DEVICE HAVING THE SAME

(75) Inventors: Takeshi Yamaguchi, Fukuoka (JP); Ryo Ando, Tokyo (JP)

(73) Assignee: Sony Corporation, Tokyo (JP)

( * ) Notice: Subject to any disclaimer, the term of this patent is extended or adjusted under 35 U.S.C. 154(b) by 481 days.

(21) Appl. No.: 11/057,339

(22) Filed: Feb. 11, 2005

(65) Prior Publication Data

US 2005/0185550 A1 Aug. 25, 2005

(30) Foreign Application Priority Data

Feb. 19, 2004 (JP) ............................ P2004-042638
Nov. 29, 2004 (JP) ............................ P2004-344968

(51) Int. Cl.
*G11B 7/00* (2006.01)
(52) U.S. Cl. ............................... 369/53.17; 369/53.32; 369/53.15; 369/47.18; 369/53.24
(58) Field of Classification Search ............. 369/53.15, 369/53.17, 47.18, 53.32, 53.24
See application file for complete search history.

(56) References Cited

U.S. PATENT DOCUMENTS 6,236,032 B1 * 5/2001 Kamiyama .................. 369/43

FOREIGN PATENT DOCUMENTS

| JP | 10021547 A | * | 1/1998 |
| JP | 10040546 A | * | 2/1998 |
| JP | 2000-090446 | | 3/2000 |

* cited by examiner

*Primary Examiner*—William Korzuch
*Assistant Examiner*—Jorge L. Ortiz-Criado
(74) *Attorney, Agent, or Firm*—Robert J. Depke; Rockey, Depke & Lyons, LLC.

(57) ABSTRACT

An optical disk reproducing device has a defect-signal generating circuit including a peak-holding-signal generating circuit for generating a peak-hold signal based on an RF signal read from a recording medium, an intermediate-signal generating circuit for generating an intermediate signal based on the peak-hold signal, a signal-level adjusting circuit for generating a threshold signal based on the intermediate signal, a threshold-signal adjusting circuit for adjusting the level of the threshold signal, and a comparator for generating a defect signal based on the peak-hold signal and threshold signal. The threshold-signal adjusting circuit includes at least one of: a first adjusting circuit for raising the threshold signal in the event the peak-hold signal falls below the threshold signal due to the peak-hold signal and the threshold signal being reversed; and a second adjusting circuit for lowering the threshold signal in the event the peak-hold signal exceeds the threshold signal, due to the reversal.

9 Claims, 11 Drawing Sheets

DEFECT-SIGNAL GENERATING CIRCUIT AND OPTICAL DISK REPRODUCING DEVICE HAVING THE SAME

The present application claims priority to Japanese Patent Applications JP2004-042638, filed in the Japanese Patent Office Feb. 19, 2004, and JP2004-344968, filed in the Japanese Patent Office Nov. 29, 2004; the entire contents of which is incorporated herein by reference.

BACKGROUND OF THE INVENTION

1. Field of the Invention

The present invention relates to a defect-signal generating circuit and an optical disk reproducing device having the same.

2. Description of the Related Art

Recently, optical disks have been widely employed as a large-capacity recording medium capable of recording mass data. Data recorded in such optical disks has been reproduced using an optical disk reproducing device.

More specifically, first, the conventional optical disk reproducing device casts reading light upon an optical disk, generates an RF signal using an optical pickup from the reflected light thereof, generates an input signal based on this RF signal, and then reproduces the data recorded in the optical disk by an signal processing circuit processing this input signal.

Now, in the event that there is a scratch or soiling or the like on the optical disk, a dark defect markedly reducing the amount of reflected light from the optical disk or a bright defect markedly increasing the amount of reflected light from the optical disk sometimes occurs, and consequently, data cannot be correctly reproduced in some cases due to this dark defect or bright defect.

In light of this, the conventional optical disk reproducing device includes a defect-signal generating circuit for generating a defect signal indicating a defect on an optical disk, and reproduces data correctly by performing servo control of the optical pickup such as focus control, tracking control, and so forth based on this defect signal (see Japanese Unexamined Patent Application Publication No. 2000-90446, for example).

As illustrated in FIG. 9, this defect-signal generating circuit 100 comprises a peak-holding circuit 101, dark-defect detection circuit 102, bright-defect detection circuit 103, and a logical-OR computing circuit 104.

The dark-defect detection circuit 102 comprises a dark-defect peak-holding circuit 105, dark-defect level-adjusting circuit 106, and dark-defect comparator 107. The bright-defect detection circuit 103 comprises a bright-defect peak-holding circuit 108, bright-defect level-adjusting circuit 109, and bright-defect comparator 110.

With the defect-signal generating circuit 100 thus configured, as illustrated in FIGS. 9 and 10, the peak-holding circuit 101 is configured so as to follow up an input signal S100 quickly, and output a peak-hold signal S101 changing at approximately the same time as the input signal S100.

On the other hand, the dark-defect and bright-defect peak-holding circuits 105 and 108 are configured so as to have a longer time constant than the peak-holding circuit 101 and slow signal follow-up, and output a dark-defect intermediate signal S102 and bright-defect intermediate signal S103 respectively, which change more sluggishly than the peak-hold signal S101.

Also, the dark-defect level-adjusting circuit 106 generates a dark-defect threshold signal S104 which is adjusted so that the signal level of the dark-defect intermediate signal S102 is lower than that of the peak-hold signal S101 except for a portion originating a dark defect. On the other hand, the bright-defect level-adjusting circuit 109 generates a bright-defect threshold signal S105 which is adjusted so that the signal level of the bright-defect intermediate signal S103 is higher than that of the peak-hold signal S101 except for a portion originating a bright defect.

Also, the dark-defect comparator 107 outputs a dark-defect signal S106 which changes to "High" level when the signal level of the peak-hold signal S101 is below the signal level of the dark-defect threshold signal S104. On the other hand, the bright-defect comparator 110 outputs a bright-defect signal S107 which changes to "High" level when the signal level of the peak-hold signal S101 is above the signal level of the bright-defect threshold signal S105.

Also, the logical-OR computing circuit 104 outputs a defect signal S108 which stays at the "High" level while detecting a dark defect and a bright defect by carrying out the logical OR operation between the dark-defect signal S106 and the bright-defect signal S107.

The optical pickup enters a servo-holding state in which operation of the servo is stopped while the defect signal S108 output from the defect-signal generating circuit 100 is at the "High" level.

Subsequently, when the defect signal S108 is at the "Low" level again, the servo-holding state is released. This is how the conventional optical disk reproducing device handles a defect on an optical disk such as a dark defect and a bright defect and the like.

That is to say, when generating the defect signal S108, the conventional optical disk reproducing device, as illustrated in FIG. 10 and FIGS. 11A and 11B, generates the defect signal S108 by comparing the peak-hold signal S101 for following up the input signal S100 quickly with the dark-defect threshold signal S104 and bright-defect threshold signal S105 for following up a signal slower than this peak-hold signal S101 (see Japanese Unexamined Patent Application Publication No. 2000-90446, for example).

Thus, when generating the defect signal S108, the conventional optical disk reproducing device having the defect-signal generating circuit 100, as illustrated in FIG. 10 and FIGS. 11A and 11B, generates the defect signal S108 by comparing the peak-hold signal S101 for following up the input signal S100 quickly with the dark-defect threshold signal S104 and bright-defect threshold signal S105 for following up a signal slower than this peak-hold signal S101.

Consequently, as illustrated in FIG. 11A, while a dark defect occurs, the signal level of the dark-defect threshold signal S104 (solid line in FIG. 11A) gradually drops with some delay following the signal level of the peak-hold signal S101 dropping (dashed line in FIG. 11A), and then becomes equal to the signal level of the peak-hold signal S101 in the portion indicating that the dark defect is still occurring.

In other words, the signal level of the peak-hold signal S101 rises above that of the dark-defect threshold signal S104 regardless of the dark defect continuing, so the defect signal S108 is unintentionally changed from the "High" level to the "Low" level in some cases.

Similarly, as illustrated in FIG. 11B, while a bright defect occurs, the signal level of the bright-defect threshold signal S105 (solid line in FIG. 11B) gradually rises with some delay following the signal level of the peak-hold signal S101 rising (dashed line in FIG. 11B), and then becomes equal to the signal level of the peak-hold signal S101 in the portion indicating that the bright defect is still occurring.

In other words, the signal level of the peak-hold signal S101 falls below that of the bright-defect threshold signal S105 regardless of the bright defect continuing, so the defect signal S108 is unintentionally changed from the "High" level to the "Low" level in some cases.

Thus, upon the defect signal S108 changing from the "High" level to the "Low" level regardless of the dark defect and bright defect still continuing for some time, unintended servo control is performed based on the erroneous input signal S100 at the time of the dark defect and bright defect. Consequently, there is the possibility that the servo cannot be controlled in a stable manner at the time of releasing the servo-holding state, resulting in data being not able to be reproduced correctly.

SUMMARY OF THE INVENTION

The present invention has been made in light of the aforementioned problems, and accordingly, it is an object of the present invention to provide a defect-signal generating circuit for generating a defect signal capable of stable servo control and an optical disk reproducing device including the circuit.

To this end, according to a first aspect of the present invention, a defect-signal generating circuit comprises: a peak-hold signal generating circuit for generating a peak-hold signal by holding the peak of an RF signal read out from a recording medium; an intermediate-signal generating circuit, which is a peak-holding circuit having a longer time constant than the peak-hold signal generating circuit, for generating an intermediate signal by holding the peak of the RF signal; a signal-level adjusting circuit for generating a threshold signal by shifting the signal level of the intermediate signal; a threshold-signal adjusting circuit for adjusting the signal level of the threshold signal; and a comparator for generating a defect signal by comparing the peak-hold signal with the threshold signal; wherein the threshold-signal adjusting circuit includes at least one of a first adjusting circuit for adjusting the signal level of the threshold signal in the event that the signal level of the peak-hold signal falls below that of the threshold signal, due to the signal level of the peak-hold signal and that of the threshold signal being reversed, so as to raise the signal level of the threshold signal higher than that in the case of no adjustment being performed, and a second adjusting circuit for adjusting the signal level of the threshold signal in the event that the signal level of the peak-hold signal rises above that of the threshold signal, due to the signal level of the peak-hold signal and that of the threshold signal being reversed, so as to lower the signal level of the threshold signal lower than that in the case of no adjustment being performed.

The threshold-signal adjusting circuit preferably adjusts the signal level of the threshold signal so as to retain the signal level of the threshold signal at the point of the signal level of the peak-hold signal and that of the threshold signal being reversed.

Upon the signal level of the peak-hold signal and that of the threshold signal being reversed, the first adjusting circuit preferably raises the signal level of the threshold signal higher than that of a first threshold signal at the point of the signal level of the peak-hold signal falling below that of the threshold signal. The first adjusting circuit preferably includes a first limiter for setting the upper limit of the signal level of the threshold signal.

Upon the signal level of the peak-hold signal and that of the threshold signal being reversed, the second adjusting circuit preferably lowers the signal level of the threshold signal lower than that of a second threshold signal at the point of the signal level of the peak-hold signal rising higher than that of the threshold signal. The second adjusting circuit preferably includes a second limiter for setting the lower limit of the signal level of the threshold signal.

Following adjusting the signal level of the threshold signal, upon the signal level of the peak-hold signal and that of the threshold signal being reversed again, the threshold-signal adjusting circuit may stop adjustment of the signal level of the threshold signal. Or, following adjusting the signal level of the threshold signal, upon a certain period elapsing, the threshold-signal adjusting circuit may stop adjustment of the signal level of the threshold signal.

According to a second aspect of the present invention, an optical disk reproducing device including a defect-signal generating circuit, the defect-signal generating circuit comprises: a peak-holding generating circuit for generating a peak-hold signal by holding the peak of an RF signal read out from a recording medium; an intermediate-signal generating circuit, which is a peak-holding circuit having a longer time constant than the peak-hold signal generating circuit, for generating an intermediate signal by holding the peak of the RF signal; a signal-level adjusting circuit for generating a threshold signal by shifting the signal level of the intermediate signal; a threshold-signal adjusting circuit for adjusting the signal level of the threshold signal; and a comparator for generating a defect signal by comparing the peak-hold signal with the threshold signal; wherein the threshold-signal adjusting circuit includes at least one of a first adjusting circuit for adjusting the signal level of the threshold signal in the event that the signal level of the peak-hold signal falls below that of the threshold signal, due to the signal level of the peak-hold signal and that of the threshold signal being reversed, so as to raise the signal level of the threshold signal higher than that in the case of no adjustment being performed, and a second adjusting circuit for adjusting the signal level of the threshold signal in the event that the signal level of the peak-hold signal rises above that of the threshold signal, due to the signal level of the peak-hold signal and that of the threshold signal being reversed, so as to lower the signal level of the threshold signal lower than that in the case of no adjustment being performed.

The present invention has advantages such as described in the following.

According to the first aspect of the present invention, a defect-signal generating circuit comprises: a peak-hold signal generating circuit for generating a peak-hold signal by holding the peak of an RF signal read out from a recording medium; an intermediate-signal generating circuit, which is a peak-holding circuit having a longer time constant than the peak-hold signal generating circuit, for generating an intermediate signal by holding the peak of the RF signal; a signal-level adjusting circuit for generating a threshold signal by shifting the signal level of the intermediate signal; a threshold-signal adjusting circuit for adjusting the signal level of the threshold signal; and a comparator for generating a defect signal by comparing the peak-hold signal with the threshold signal; wherein the threshold-signal adjusting circuit includes at least one of a first adjusting circuit for adjusting the signal level of the threshold signal in the event that the signal level of the peak-hold signal falls below that of the threshold signal, due to the signal level of the peak-hold signal and that of the threshold signal being reversed, so as to raise the signal level of the threshold signal higher than that in the case of no adjustment being performed, and a second adjusting circuit for adjusting the signal level of the threshold signal in the event that the signal level of the peak-hold signal rises above that of the threshold signal, due to the signal level of the peak-hold signal and that of the threshold signal being reversed, so as to lower the signal level of the threshold signal lower than that in the case of no adjustment being performed.

Also, according to the present invention, the threshold-signal adjusting circuit preferably adjusts the signal level of the threshold signal so as to retain the signal level of the threshold signal at the point of the signal level of the peak-hold signal and that of the threshold signal being reversed, thereby controlling the servo in a stable manner at the time of releasing the servo-holding state.

Also, according to the present invention, upon the signal level of the peak-hold signal and that of the threshold signal being reversed, the first adjusting circuit preferably raises the signal level of the threshold signal higher than that of a first threshold signal at the point of the signal level of the peak-hold signal falling below that of the threshold signal, thereby controlling the servo in a stable manner at the time of releasing the servo-holding state due to a dark defect.

Also, according to the present invention, the first adjusting circuit preferably includes a first limiter for setting the upper limit of the signal level of the threshold signal, whereby even if a dark defect continuing for a long period occurs, the servo can be controlled in a stable manner at the time of releasing the servo-holding state due to this dark defect.

Also, according to the present invention, upon the signal level of the peak-hold signal and that of the threshold signal being reversed, the second adjusting circuit preferably lowers the signal level of the threshold signal lower than that of a second threshold signal at the point of the signal level of the peak-hold signal rising higher than that of the threshold signal, thereby controlling the servo in a stable manner at the time of releasing the servo-holding state due to a bright defect.

Also, according to the present invention, the second adjusting circuit preferably includes a second limiter for setting the lower limit of the signal level of the threshold signal, whereby even if a bright defect continuing for a long period occurs, the servo can be controlled in a stable manner at the time of releasing the servo-holding state due to this bright defect.

Also, according to the present invention, following adjusting the signal level of the threshold signal, upon the signal level of the peak-hold signal and that of the threshold signal being reversed again, the threshold-signal adjusting circuit stops adjustment of the signal level of the threshold signal, thereby controlling the servo in a stable manner at the time of releasing the servo-holding state.

Also, according to the present invention, following adjusting the signal level of the threshold signal, upon a certain period elapsing, the threshold-signal adjusting circuit stops adjustment of the signal level of the threshold signal, thereby preventing the servo-holding state from occurring for a long period due to erroneous detection of a defect on an optical disk.

Also, according to a second aspect of the present invention, an optical disk reproducing device including a defect-signal generating circuit, the defect-signal generating circuit comprises: a peak-hold signal generating circuit for generating a peak-hold signal by holding the peak of an RF signal read out from a recording medium; an intermediate-signal generating circuit, which is a peak-holding circuit having a longer time constant than the peak-hold signal generating circuit, for generating an intermediate signal by holding the peak of the RF signal; a signal-level adjusting circuit for generating a threshold signal by shifting the signal level of the intermediate signal; a threshold-signal adjusting circuit for adjusting the signal level of the threshold signal; and a comparator for generating a defect signal by comparing the peak-hold signal with the threshold signal; wherein the threshold-signal adjusting circuit includes at least one of a first adjusting circuit for adjusting the signal level of the threshold signal in the event that the signal level of the peak-hold signal falls below that of the threshold signal, due to the signal level of the peak-hold signal and that of the threshold signal being reversed, so as to raise the signal level of the threshold signal higher than that in the case of no adjustment being performed, and a second adjusting circuit for adjusting the signal level of the threshold signal in the event that the signal level of the peak-hold signal rises above that of the threshold signal, due to the signal level of the peak-hold signal and that of the threshold signal being reversed, so as to lower the signal level of the threshold signal lower than that in the case of no adjustment being performed.

DESCRIPTION OF THE PREFERRED EMBODIMENTS

Figure 1:
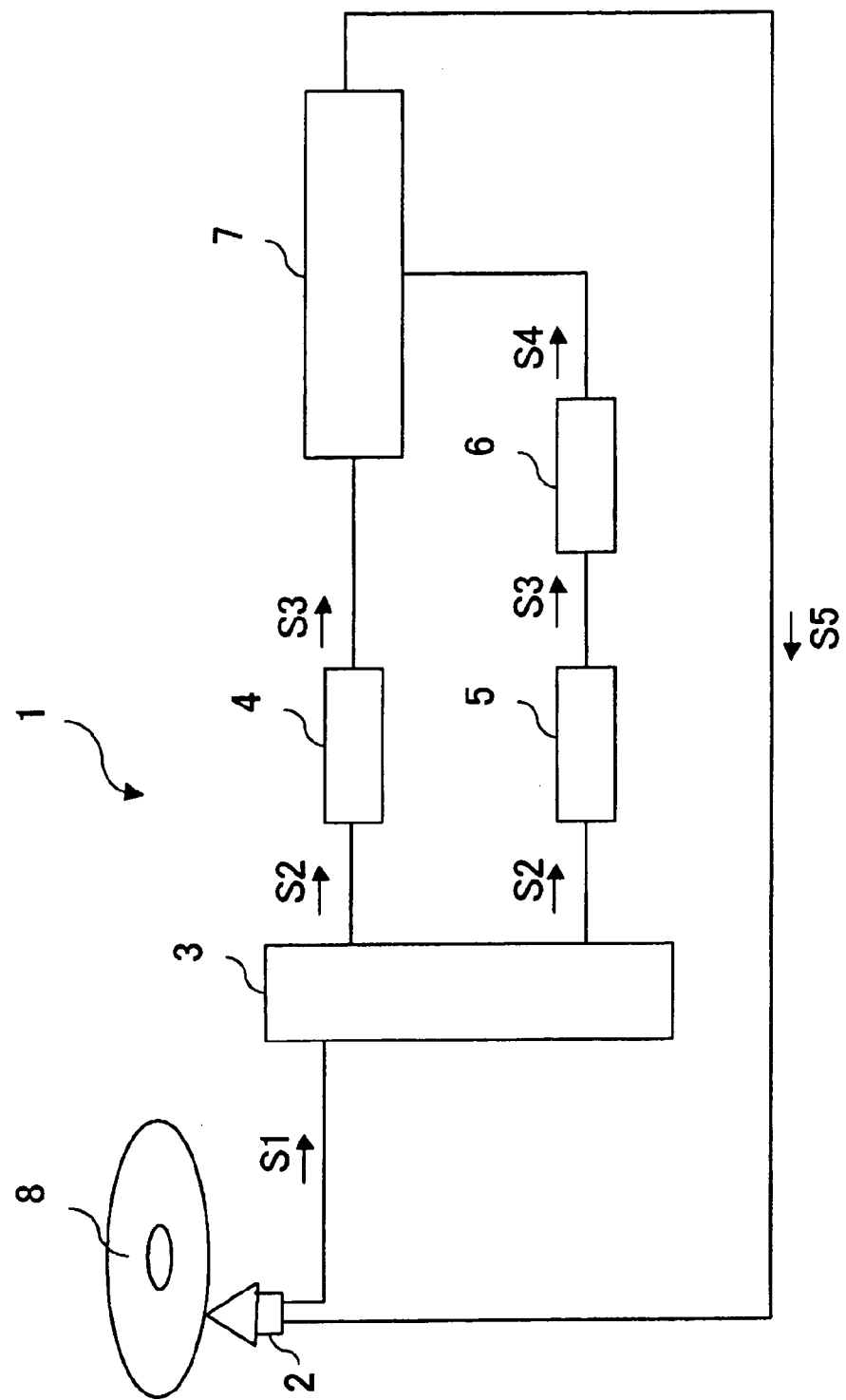
FIG. 1 is an explanatory diagram illustrating an optical disk reproducing device according to the present invention.

An optical disk reproducing device including a defect-signal generating circuit according to the present invention comprises: an optical pickup for reading out an analog data signal from an optical disk; an RF signal generating circuit for generating a servo control RF signal from this analog data signal; an analog-to-digital converter performing A/D conversion of this RF signal to a digital signal; a defect-signal generating circuit for generating a defect signal by detecting a defect on the optical disk from this analog-to-digital converted RF signal; and a servo-control circuit for performing servo control based on this defect signal.

Also, the defect-signal generating circuit comprises: a peak-hold signal generating circuit for generating a peak-hold signal by holding the peak of an RF signal read out from a recording medium; an intermediate-signal generating circuit, which is a peak-holding circuit having a longer time constant than the peak-hold signal generating circuit, for generating an intermediate signal by holding the peak of an RF signal; a filter circuit for generating a low-pass intermediate signal of which steep change is absorbed; a signal-level adjusting circuit for generating a threshold signal by shifting the signal level of the low-pass intermediate signal so as to differ from the signal level of the peak-hold signal; and a comparator for generating a defect signal by comparing the peak-hold signal with the threshold signal.

This defect-signal generating circuit further includes a threshold-signal adjusting circuit for adjusting the signal level of the threshold signal by adjusting the signal level of the low-pass intermediate signal. This threshold-signal adjusting circuit includes at least any one of: a first adjusting circuit for adjusting the signal level of the threshold signal in the event that the signal level of the peak-hold signal falls below that of the threshold signal so as to raise the signal level of the threshold signal higher than that in the case of no adjustment being performed; and a second adjusting circuit for adjusting the signal level of the threshold signal in the event that the signal level of the peak-hold signal rises above that of the threshold signal so as to lower the signal level of the threshold signal lower than that in the case of no adjustment being performed.

Consequently, the threshold signal having a signal level higher than that in the case of no adjustment being performed using the first adjusting circuit is generated by adjusting the signal level of the threshold signal using the first adjusting circuit while the abnormally low signal level of the peak-hold signal is input to a defect detection circuit due to a defect on the optical disk.

Thus, the threshold signal having a signal level generally equal to the signal level near the normal signal level to be returned following input of the aforementioned abnormally low signal level of the peak-hold signal being complete can be generated, thereby controlling the servo in a stable manner at the time of releasing the servo-holding state due to detection of a defect on the optical disk.

Similarly, the threshold signal having a signal level lower than that in the case of no adjustment being performed using the second adjusting circuit is generated by adjusting the signal level of the threshold signal using the second adjusting circuit while the abnormally high signal level of the peak-hold signal is input to the defect detection circuit due to a defect on the optical disk.

Thus, the threshold signal having a signal level generally equal to the signal level near the normal signal level to be returned following input of the aforementioned abnormally high signal level of the peak-hold signal being complete can be generated, thereby controlling the servo in a stable manner at the time of releasing the servo-holding state due to detection of a defect on the optical disk.

As described above, the threshold-signal adjusting circuit for adjusting the signal level of the threshold signal, of which the first adjusting circuit and the second adjusting circuit may be configured of a signal-level holding circuit for holding the signal level of the threshold signal at the point of the signal level of the peak-hold signal and that of the threshold signal being reversed.

This signal-level holding circuit is configured with a switch circuit provided on the input side of the filter circuit, the low-pass intermediate signal to be output from the filter circuit to this switch circuit and the intermediate signal to be output from the intermediate-signal generating circuit are input, and one or the other of the low-pass intermediate signal and intermediate signal is input to the filter circuit based on the threshold signal.

In the event that the threshold-signal adjusting circuit is configured of this signal-level holding circuit, when the signal level of the peak-hold signal and that of the threshold signal are reversed, the signal level of the threshold signal at the point of the signal level of the peak-hold signal and that of the threshold signal being reversed is held by inputting the low-pass intermediate signal to the filter circuit using the switch circuit, whereby the signal level of the threshold signal is always held in a constant level so as not to change the signal level of the threshold signal by following change of the signal level of the peak-hold signal while the signal level of the peak-hold signal and that of the threshold signal are reversed, i.e., while the defect-signal generating circuit is detecting a defect on the optical disk.

Thus, in the event that the signal level of the peak-hold signal falls below the signal level of the threshold signal due to the signal level of the peak-hold signal and that of the threshold signal being reversed, the signal level of the threshold signal can be held and raised higher than that in the case of no adjustment being performed, on the other hand, even in the event that the signal level of the peak-hold signal rises above the signal level of the threshold signal, the signal level of the threshold signal can be held and dropped lower than that in the case of no adjustment being performed, and the threshold signal having a signal level generally equal to the signal level near the normal signal level to which the peak-hold signal having the abnormal signal level is returned can be generated, thereby controlling the servo in a stable manner at the time of releasing the servo-holding state due to detection of a defect on the optical disk.

The servo-control circuit performs servo control for stopping operation of the servo and making the transition to the servo-holding state while the threshold-signal adjusting circuit is adjusting the threshold signal, i.e., while the signal-level holding circuit is holding the signal level of the threshold signal.

Also, the threshold-signal adjusting circuit comprises: the first adjusting circuit for raising the signal level of the threshold signal higher than that at the point of the signal level of the peak-hold signal falling below that of the threshold signal due to the signal level of the peak-hold signal and that of the threshold signal being reversed; and the second adjusting circuit for lowering the signal level of the threshold signal lower than that at the point of the signal level of the peak-hold signal rising higher than that of the threshold signal due to the signal level of the peak-hold signal and that of the threshold signal being reversed, thereby further controlling the servo in further a stable manner at the time of releasing the servo-holding state.

With the first adjusting circuit, a first gain adjusting circuit for raising the signal level of the low-pass intermediate signal is included in the signal-level holding circuit, and the low-pass intermediate signal of which signal level is raised by this first gain adjusting circuit is input to the switch circuit.

With the second adjusting circuit, a second gain adjusting circuit for lowering the signal level of the low-pass intermediate signal is included in the signal-level holding circuit, and the low-pass intermediate signal of which signal level is lowered by this second gain adjusting circuit is input to the switch circuit.

Thus, in the event that the signal level of the peak-hold signal falls below that of the threshold signal due to the signal level of the peak-hold signal and that of the threshold signal being reversed, the signal level of the threshold signal can be gradually raised from the point of the signal level of the peak-hold signal and that of the threshold signal being reversed.

Similarly, in the event that the signal level of the peak-hold signal rises above that of the threshold signal due to the signal level of the peak-hold signal and that of the threshold signal being reversed, the signal level of the threshold signal can be gradually lowered from the point of the signal level of the peak-hold signal and that of the threshold signal being reversed.

Accordingly, following input of the peak-hold signal having an abnormally low or abnormally high signal level being complete, the threshold signal having a signal level generally equal to the signal level near the normal signal level to which the peak-hold signal having the abnormal signal level is returned can be generated, thereby controlling the servo in an even more stable manner at the time of releasing the servo-holding state due to detection of a defect on the optical disk.

Also, the first adjusting circuit having the first gain adjusting circuit preferably includes a first limiter circuit for setting the upper limit of the signal level of the threshold signal, and the second adjusting circuit having the second gain adjusting circuit preferably includes a second limiter circuit for setting the lower limit of the signal level of the threshold signal.

As described above, providing the first limiter circuit prevents the signal level of the threshold signal from rising higher than the signal level of the peak-hold signal even in the event that the peak-hold signal having an abnormally low signal level is input to the defect detection circuit for a long period, thereby constantly generating the most appropriate threshold signal.

Similarly, providing the second limiter circuit prevents the signal level of the threshold signal from dropping lower than the normal peak-hold signal level even in the event that the peak-hold signal having an abnormally high signal level is input to the defect detection circuit for a long period, thereby constantly generating the most appropriate threshold signal.

Also, in the event that the signal level of the peak-hold signal and that of the threshold signal are reversed again following the signal level of the threshold signal being adjusted, the threshold-signal adjusting circuit stops adjustment of the signal level of the threshold signal.

Accordingly, the signal level of the peak-hold signal and that of the threshold signal are reversed in the vicinity of the end of the portion where the peak-hold signal indicates occurrence of a defect.

Thus, the defect-signal generating circuit can input the defect signal for releasing the servo-holding state to the servo-control circuit at approximately the same time as the defect-signal generating circuit stops detection of a defect on the optical disk. This means that the servo can be controlled in a stable manner at the time of releasing the servo-holding state, and data recorded in the optical disk can be reproduced correctly.

Also, the threshold-signal adjusting circuit can stop adjustment of the signal level of the threshold signal by switching the switch circuit following the signal level of the threshold signal being adjusted and a certain period elapsing. Thus, occurrence of the servo-holding state for a long period due to erroneous detection of a defect on an optical disk can be prevented.

Also, the threshold signal to be employed at the time of generating the defect signal is generated using low-frequency components of the intermediate signal through the processing of the filter circuit. Thus, steep change in the signal level of the threshold signal can be prevented when the switch circuit switches.

Specific description will be made below regarding an optical disk reproducing device including the defect-signal generating circuit according to the present invention, with reference to the drawings.

An optical disk reproducing device 1, as illustrated in FIG. 1, includes an optical pickup 2, RF amplifier 3, servo-control analog-to-digital converter 4 (hereinafter, referred to as servo-control DAC 4), defect-detection analog-to-digital converter 5 (hereinafter, referred to as defect-detection DAC 5), defect-signal generating circuit 6, and servo-control circuit 7. 8 in FIG. 1 denotes an optical disk.

The optical pickup 2 casts data reading light on the optical disk 8, generates an analog data signal S1 corresponding to the amount of reflection of this light, and inputs this to the RF amplifier 3. The RF amplifier 3 generates an RF (Radio Frequency) amplified signal S2 by amplifying the analog data signal S1 input from the optical pickup 2, and inputs this to the servo-control DAC 4 and defect-detection DAC 5. The servo-control DAC 4 generates an RF signal S3 from the RF amplified signal S2 input from the RF amplifier 3 in analog-to-digital conversion, and inputs this to the servo-control circuit 7.

The defect-detection DAC 5 generates an RF signal S3 from the RF amplified signal S2 input from the RF amplifier 3 in analog-to-digital conversion, and inputs this to the defect-signal generating circuit 6. The defect-signal generating circuit 6 generates a defect signal S4 which is in an active state (hereinafter, referred to as "High" level) while detecting a defect on the optical disk 8 based on the RF signal S3 input from the defect-detection DAC 5 and is in an inactive state (hereinafter, referred to as "Low" level) while detecting no defect, and inputs this to the servo-control circuit 7.

The servo-control circuit 7 outputs a servo-control signal S5 for performing servo-control of the optical pickup 2 to the optical pickup 2 based on the RF signal S3 input form the servo-control DAC 4 and the defect signal S4 input from the defect-signal generating circuit 6. This servo-control circuit 7 is configured so as to output the servo-control signal S5 for performing normal servo control to the optical pickup 2 while inputting the "Low" level defect signal S4, on the other hand, so as to make the servo into the servo-holding state by outputting the servo-control signal S5 serving as a constant driving signal, which is generated by extracting only low-pass components of the RF signal S3, to the optical pickup 2 while inputting the "High" level defect signal S4.

More specific description will be made below regarding the defect-signal generating circuit included in the optical disk reproducing device according to the present embodiment and the servo-control circuit with reference to FIGS. 2 through 8.

First Embodiment

With the first embodiment, description will be made regarding an example in the case in which a threshold-signal adjusting circuit for adjusting the signal level of the threshold signal is made up of a first adjusting circuit and a second adjusting circuit, a dark-defect signal-level holding circuit for holding the signal level of the threshold signal at the point of the signal level of the peak-hold signal and that of the threshold signal being reversed is employed as this first adjusting circuit, and a bright-defect signal-level holding circuit is employed as the second adjusting circuit.

Figure 2:
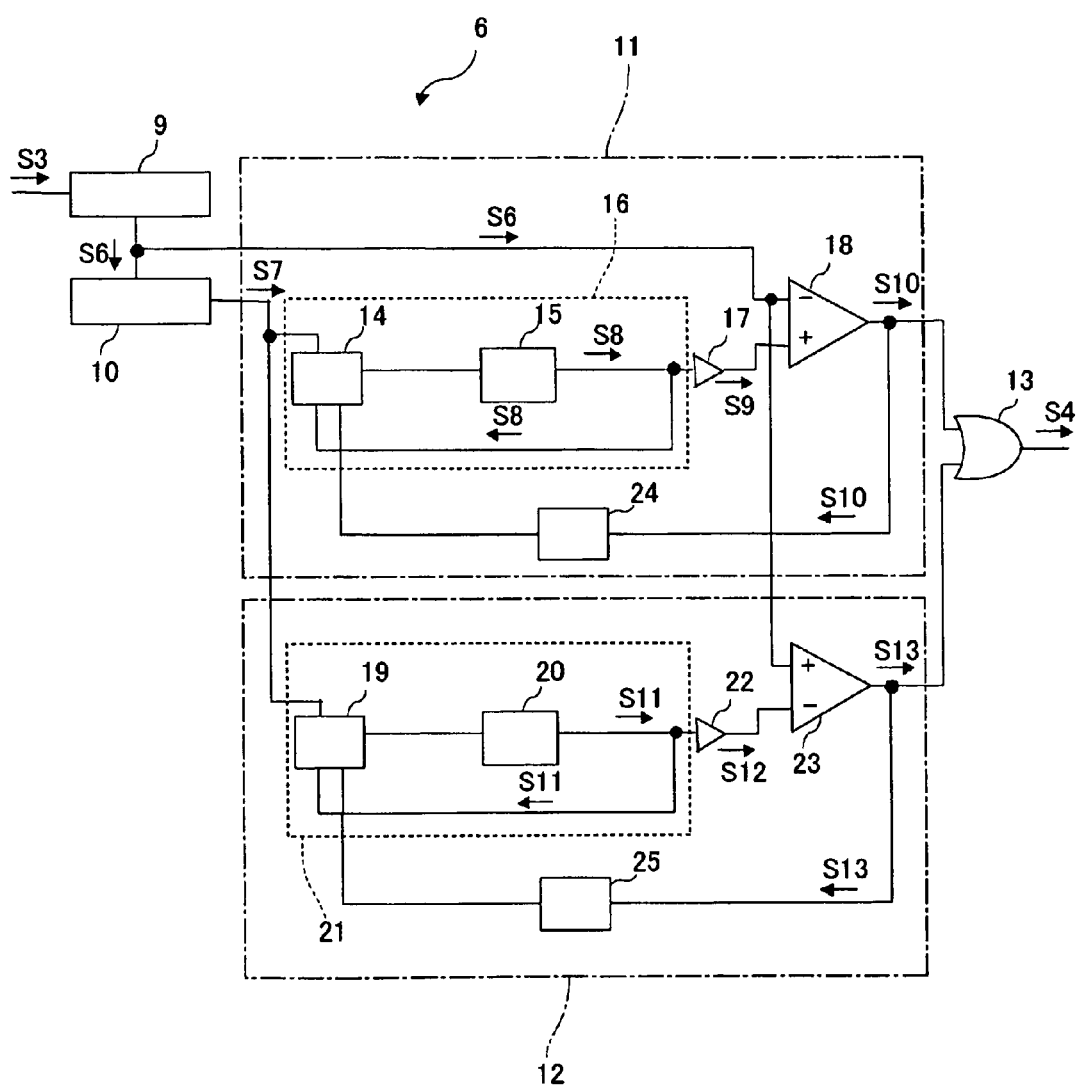
FIG. 2 is an explanatory diagram illustrating a defect-signal generating circuit according to a first embodiment.

As illustrated in FIG. 2, the defect-signal generating circuit 6 comprises a peak-holding circuit 9, intermediate-signal generating circuit 10, dark-defect detection circuit 11, bright-defect detection circuit 12, and logical-OR computing circuit 13.

The dark-defect detection circuit 11 is a circuit for detecting a dark defect markedly reducing the amount of reflection of light read by the optical pickup 2 due to adhesion of dust or soiling or the like on the optical disk 8 at the time of reproducing data. This dark-defect detection circuit 11 comprises the first adjusting circuit (hereinafter, referred to as a dark-defect signal-level holding circuit 16) made up of a dark-defect switch circuit 14 and dark-defect filter circuit 15, dark-defect level-adjusting circuit 17, and dark-defect comparator 18.

On the other hand, the bright-defect detection circuit 12 is a circuit for detecting a bright defect wherein the amount of reflection of light read by the optical pickup 2 markedly increases due to adhesion of dust or soiling or the like on the optical disk 8 being removed at the time of reproducing data. This bright-defect detection circuit 12 comprises the second adjusting circuit (hereinafter, referred to as a bright-defect signal-level holding circuit 21) made up of a bright-defect switch circuit 19 and bright-defect filter circuit 20, bright-defect level-adjusting circuit 22, and bright-defect comparator 23.

The defect-signal generating circuit 6 thus configured generates the defect signal S4 as described below.

First, the RF signal S3 input from the defect-detection DAC 5 is input to the peak-holding circuit 9. This peak-holding circuit 9 is configured so as to quickly follow up the RF signal S3 serving as an input signal, generates a peak-hold signal S6 sensitively holding change-of-peak of the RF signal S3 input from the defect-detection DAC 5, and inputs this to the intermediate-signal generating circuit 10, dark-defect comparator 18, and bright-defect comparator 23.

The intermediate-signal generating circuit 10 is configured so as to have a longer time constant than the peak-holding circuit 9 and slow signal follow-up, generates an intermediate signal S7 based on the peak-hold signal S6 input from the peak-holding circuit 9, and inputs this to the dark-defect signal-level holding circuit 16 and bright-defect signal-level holding circuit 21.

Figure 3:
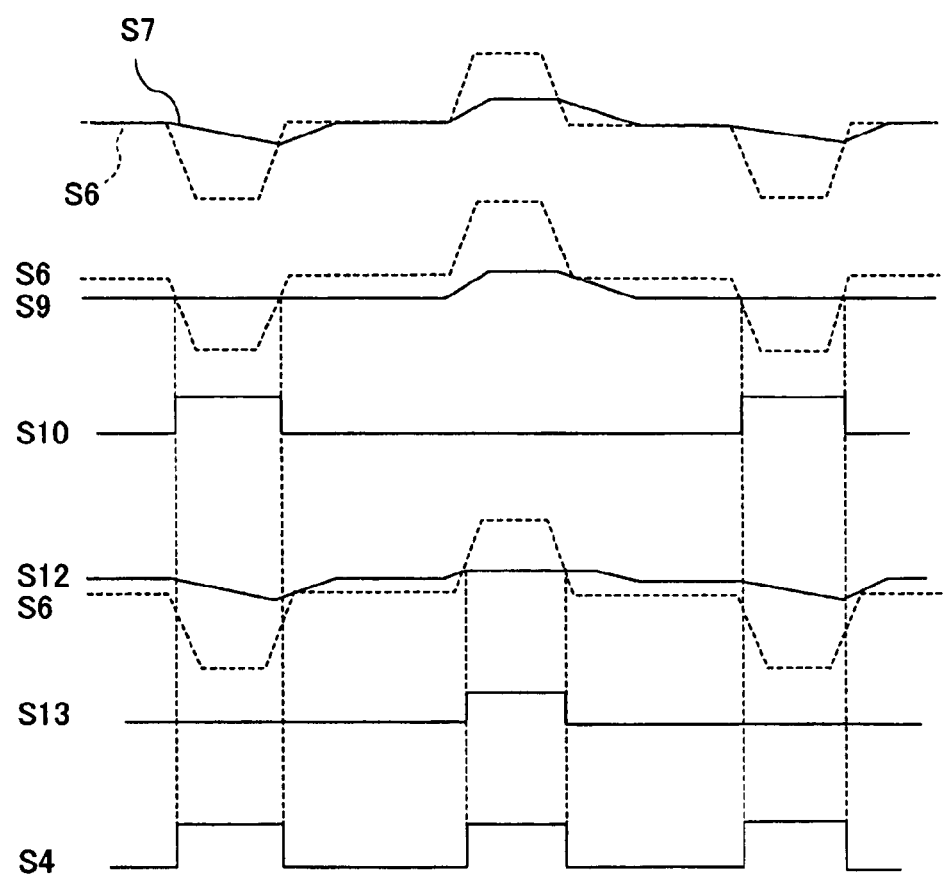
FIG. 3 is a timing chart illustrating a defect signal according to the first embodiment.

This intermediate signal S7 is a signal holding the peak of the RF signal S3 indirectly by holding the peak of the peak-hold signal S6, and also is a signal which changes with some delay following the peak-hold signal S6 changing as illustrated in FIG. 3.

With the present embodiment, when generating this intermediate signal S7, the intermediate signal S7 holding the peak of the RF signal S3 indirectly is generated by generating the intermediate signal S7 from the peak-hold signal S6 using the intermediate-signal generating circuit 10 following generating the peak-hold signal S6 from the RF signal S3 using the peak-holding circuit 9. However, an arrangement may be made wherein the intermediate-signal generating circuit 10 is provided at the input sides of the both the dark-defect detection circuit 11 and the bright-defect detection circuit 12, and the intermediate signal S7 holding the peak of the RF signal S3 directly is generated by directly inputting the RF signal S3 to this intermediate-signal generating circuit 10.

The dark-defect signal-level holding circuit 16 inputs the intermediate signal S7 to the dark-defect filter circuit 15 using the dark-defect switch circuit 14 when detecting no dark defect, on the other hand, inputs a later-described dark-defect low-pass intermediate signal S8 to the dark-defect filter circuit 15 again without any change using the dark-defect switch circuit 14 when detecting a dark defect.

The dark-defect filter circuit 15 generates a dark-defect low-pass intermediate signal S8 which reduces a significant change in the signal level by removing the high-frequency components of the intermediate signal S7, and inputs this to the dark-defect level-adjusting circuit 17.

At this time, the dark-defect filter circuit 15 feeds back the dark-defect low-pass intermediate signal S8, and inputs this to the dark-defect switch circuit 14 at the same time.

The dark-defect level-adjusting circuit 17 generates a dark-defect threshold signal S9 (see FIG. 3) which is adjusted so that the signal level of the dark-defect low-pass intermediate signal S8 input from the dark-defect filter circuit 15 can be suppressed lower than the signal level of the peak-hold signal S6, and inputs this to the dark-defect comparator 18.

The dark-defect comparator 18 compares the signal level of the peak-hold signal S6 with that of the dark-defect threshold signal S9, generates a dark-defect signal S10 which goes to the "High" level while the signal level of the peak-hold signal S6 and that of the dark-defect threshold signal S9 are reversed, and inputs this to the logical-OR computing circuit 13. At this time, the dark-defect comparator 18 feeds back the dark-defect signal S10, and inputs this to the dark-defect switch circuit 14.

Subsequently, the dark-defect switch circuit 14 switches a signal to be input to the dark-defect filter circuit 15 based on the dark-defect signal S10 input at this time.

More specifically, the dark-defect switch circuit 14 switches a signal to be input to the dark-defect filter circuit 15 from the intermediate signal S7 to the dark-defect low-pass intermediate signal S8 at the point of starting detection of a dark defect, i.e., at the point of the dark-defect signal S10 switching from the "Low" level to the "High" level by the signal level of the peak-hold signal S6 and that of the dark-defect threshold signal S9 being reversed.

Thus, the dark-defect low-pass intermediate signal S8 serving as the output signal of the dark-defect filter circuit 15 is input to the dark-defect filter circuit 15 again without any change, so the dark-defect low-pass intermediate signal S8 is continuously input to the dark-defect level-adjusting circuit 17, and consequently, the signal level of the dark-defect threshold signal S9 serving as the output signal of the dark-defect level-adjusting circuit 17 is held. Thus, the signal level of the dark-defect threshold signal S9 can be held at approximately the same time as the dark-defect detection circuit 11 detects a dark defect.

On the other hand, the dark-defect switch circuit 14 switches a signal to be input to the dark-defect filter circuit 15 from the dark-defect low-pass intermediate signal S8 to the intermediate signal S7 at the point of completing detection of a dark defect, i.e., at the point of the dark-defect signal S10 switching from the "High" level to the "Low" level by the signal level of the peak-hold signal S6 and that of the dark-defect threshold signal S9 being reversed again.

Thus, the intermediate signal S7 is input to the dark-defect filter 15, the signal level of the dark-defect threshold signal S9 changes based on this intermediate signal S7, and consequently, holding of the signal level of the dark-defect threshold signal S9 is stopped. Thus, holding of the signal level of the dark-defect threshold signal S9 is stopped at approximately the same time as the dark-defect detection circuit 11 completes detection of a dark defect.

Furthermore, this dark-defect detection circuit 11 includes a dark-defect pulse-width limiting circuit 24 between the dark-defect comparator 18 and the dark-defect switch circuit 14, and holding of the signal level of the dark-defect threshold signal S9 is stopped using this dark-defect pulse-width limiting circuit 24.

More specifically, the dark-defect signal S10 is input to the dark-defect pulse-width limiting circuit 24 from the dark-defect comparator 18.

Here, the dark-defect pulse-width limiting circuit 24 sets a pulse width beforehand serving as a duration period over which the "High" level of the dark-defect signal S10 continues, and limits the pulse-width in the event that the pulse width of the dark-defect signal S10 exceeds the pulse width set beforehand.

Subsequently, the dark-defect signal S10 of which the pulse width is limited by this dark-defect pulse-width limiting circuit 24 is input to the dark-defect switch circuit 14. The dark-defect switch circuit 14 then stops holding of the signal level of the dark-defect threshold signal S9 by switching a signal to be input to the dark-defect filter circuit 15 from the dark-defect low-pass intermediate signal S8 to the intermediate signal S7 at the point of the dark-defect signal S10 input from the dark-defect pulse-width limiting circuit 24 switching from the "High" level to the "Low" level.

Next, description will be made regarding the bright-defect signal-level holding circuit 21.

The bright-defect signal-level holding circuit 21 inputs the intermediate signal S7 to the bright-defect filter circuit 20 using the bright-defect switch circuit 19 when detecting no bright defect, on the other hand, inputs a later-described bright-defect low-pass intermediate signal S11 to the bright-defect filter circuit 20 again without any change using the bright-defect switch circuit 19 when detecting a bright defect.

The bright-defect filter circuit 20 generates a bright-defect low-pass intermediate signal S11 which reduces significant change in the signal level by removing the high-frequency components of the intermediate signal S7, and inputs this to the bright-defect level-adjusting circuit 22. At this time, the bright-defect filter circuit 20 feeds back the bright-defect low-pass intermediate signal S11, and inputs this to the bright-defect switch circuit 19 at the same time.

The bright-defect level-adjusting circuit 22 generates a bright-defect threshold signal S12 (see FIG. 3) which is adjusted so that the signal level of the bright-defect low-pass intermediate signal S11 input from the bright-defect filter circuit 20 can be adjusted so as to be higher than the signal level of the peak-hold signal S6, and inputs this to the bright-defect comparator 23.

The bright-defect comparator 23 compares the signal level of the peak-hold signal S6 with that of the bright-defect threshold signal S12, generates a bright-defect signal S13 which goes to the "High" level while the signal level of the peak-hold signal S6 and that of the bright-defect threshold signal S12 are reversed, and inputs this to the logical-OR computing circuit 13. At this time, the bright-defect comparator 23 feeds back the bright-defect signal S13, and inputs this to the bright-defect switch circuit 19.

Subsequently, the bright-defect switch circuit 19 switches a signal to be input to the bright-defect filter circuit 20 based on the bright-defect signal S13 input at this time.

More specifically, the bright-defect switch circuit 19 switches a signal to be input to the bright-defect filter circuit 20 from the intermediate signal S7 to the bright-defect low-pass intermediate signal S11 at the point of starting detection of a bright defect, i.e., at the point of the bright-defect signal S13 switching from the "Low" level to the "High" level by the signal level of the peak-hold signal S6 and that of the bright-defect threshold signal S12 being reversed.

Thus, the bright-defect low-pass intermediate signal S11 serving as the output signal of the bright-defect filter circuit 20 is input to the bright-defect filter circuit 20 again without any change, so the bright-defect low-pass intermediate signal S11 is continuously input to the bright-defect level-adjusting circuit 22, and consequently, the signal level of the bright-defect threshold signal S12 serving as the output signal of the bright-defect level-adjusting circuit 22 is held.

Thus, the signal level of the bright-defect threshold signal S12 can be held at approximately the same time as the bright-defect detection circuit 12 detecting a bright defect.

On the other hand, the bright-defect switch circuit 19 switches a signal to be input to the bright-defect filter circuit 20 from the bright-defect low-pass intermediate signal S11 to the intermediate signal S7 at the point of completing detection of a bright defect, i.e., at the point of the bright-defect signal S13 switching from the High level to the "Low" level by the signal level of the peak-hold signal S6 and that of the bright-defect threshold signal S12 being reversed again.

Thus, the intermediate signal S7 is input to the bright-defect filter circuit 20, the signal level of the bright-defect threshold signal S12 changes based on this intermediate signal S7, and consequently, holding of the signal level of the bright-defect threshold signal S12 is stopped. Thus, holding of the signal level of the bright-defect threshold signal S12 is stopped at approximately the same time as the bright-defect detection circuit 12 completes detection of a bright defect.

Furthermore, this bright-defect detection circuit 12 includes a bright-defect pulse-width limiting circuit 25 between the bright-defect comparator 23 and the bright-defect switch circuit 19, and holding of the signal level of the bright-defect threshold signal S12 is stopped using this bright-defect pulse-width limiting circuit 25.

More specifically, the bright-defect signal S13 is input to the bright-defect pulse-width limiting circuit 25 from the bright-defect comparator 23.

Here, the bright-defect pulse-width limiting circuit 25 sets a pulse width beforehand which serves as a duration period over which the "High" level of the bright-defect signal S13 continues, and limits the pulse-width in the event that the pulse width of the bright-defect signal S13 exceeds the pulse width set beforehand.

Subsequently, the bright-defect signal S13 of which the pulse width is limited by this bright-defect pulse-width limiting circuit 25 is input to the bright-defect switch circuit 19. The bright-defect switch circuit 19 then stops holding of the signal level of the bright-defect threshold signal S12 by switching a signal to be input to the bright-defect filter circuit 20 from the bright-defect low-pass intermediate signal S11 to the intermediate signal S7 at the point of the bright-defect signal S13 input from the bright-defect pulse-width limiting circuit 25 switching from the "High" level to the "Low" level.

Next, description will be made regarding the logical-OR computing circuit 13. The logical-OR computing circuit 13 generates a defect signal S4 (see FIG. 3) which goes to the "High" level while detecting a dark defect and a bright defect by carrying out the logical OR operation between the dark-defect signal S10 input from the dark-defect detection circuit 11 and the bright-defect signal S13 input from the bright-defect detection circuit 12, and outputs this to the servo control circuit 7.

The servo control circuit 7 outputs the servo control signal S5 which stops operation of the servo of the optical pickup 2 so as to make the optical pickup 2 into the servo-holding state while the defect signal S4 input from the logical-OR computing circuit 13 is at the "High" level, and then outputs the servo control signal S5 which releases the servo-holding state so as to resume operation of the optical pickup 2 when the defect signal S4 returns to the "Low" level again.

Thus, the optical disk reproducing device 1 including the defect-signal generating circuit 6 according to the first embodiment is configured so as to hold the signal level of the threshold signal reversed in the event that the RF signal S3 indicating a defect on the optical disk 8 is input, and the signal level of the peak-hold signal S6 and any one of the dark-defect threshold signal S9 and the bright-defect threshold signal S12 are reversed.

Subsequently, holding of the signal level is stopped in the event that the signal level of the peak-hold signal S6 and that of this threshold signal are reversed again following holding the signal level of this threshold signal. Thus, the signal level of the threshold signal is always held at a constant level so as not to change the signal level of the threshold signal by following change of the signal level of the peak-hold signal S6 while the signal level of the peak-hold signal S6 and that of the threshold signal are reversed, i.e., while the defect-signal generating circuit 6 is detecting a defect on the optical disk 8.

Figure 4A:
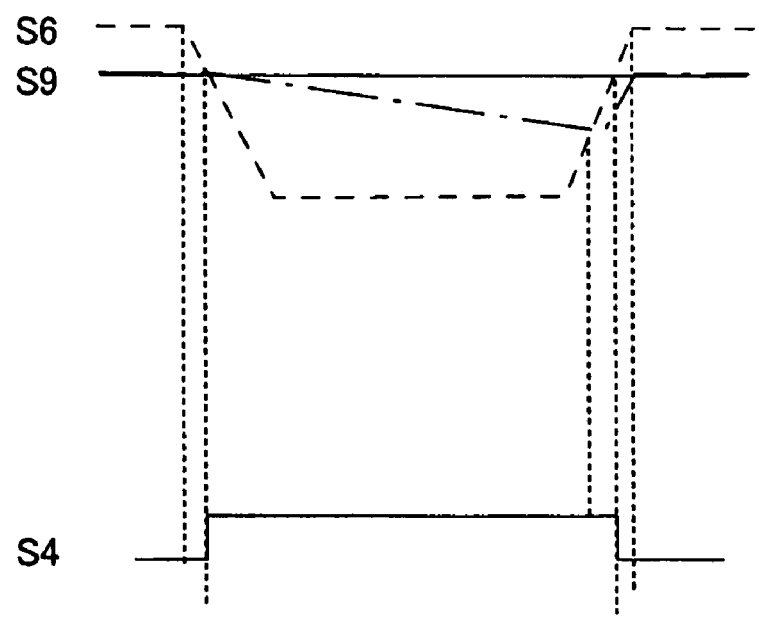
FIG. 4 is a timing chart illustrating a defect signal according to the first embodiment at the time of detecting a defect.

Accordingly, when detecting a dark defect, the signal level of the peak-hold signal S6 (dashed line in FIG. 4A) and the signal level of the dark-defect threshold signal S9 (solid line in FIG. 4A) are reversed in the vicinity of the end of the portion where the peak-hold signal S6 indicates occurrence of a dark defect as illustrated in FIG. 4A, and consequently, the signal level of the peak-hold signal S6 and that of the dark-defect threshold signal are not reversed before the end of a dark defect, such as a conventional dark-defect threshold signal as illustrated with a chain line in FIG. 4A.

Figure 4B:
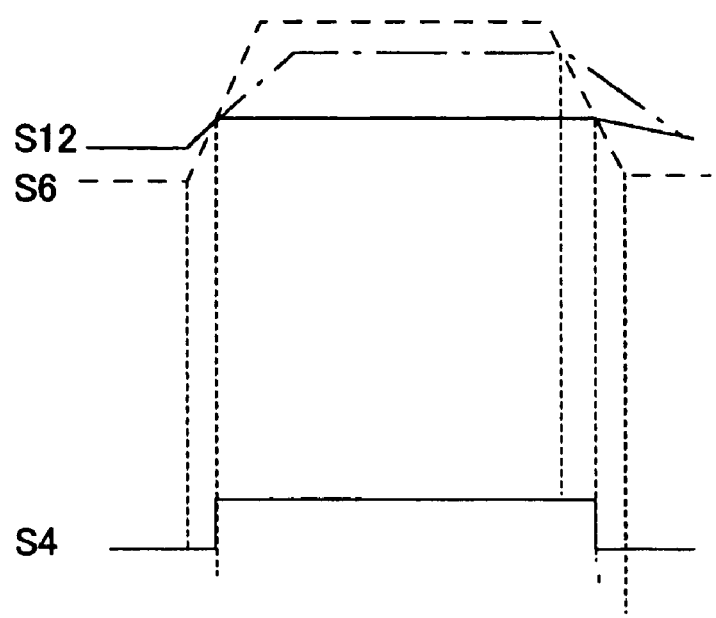
Figure 5:
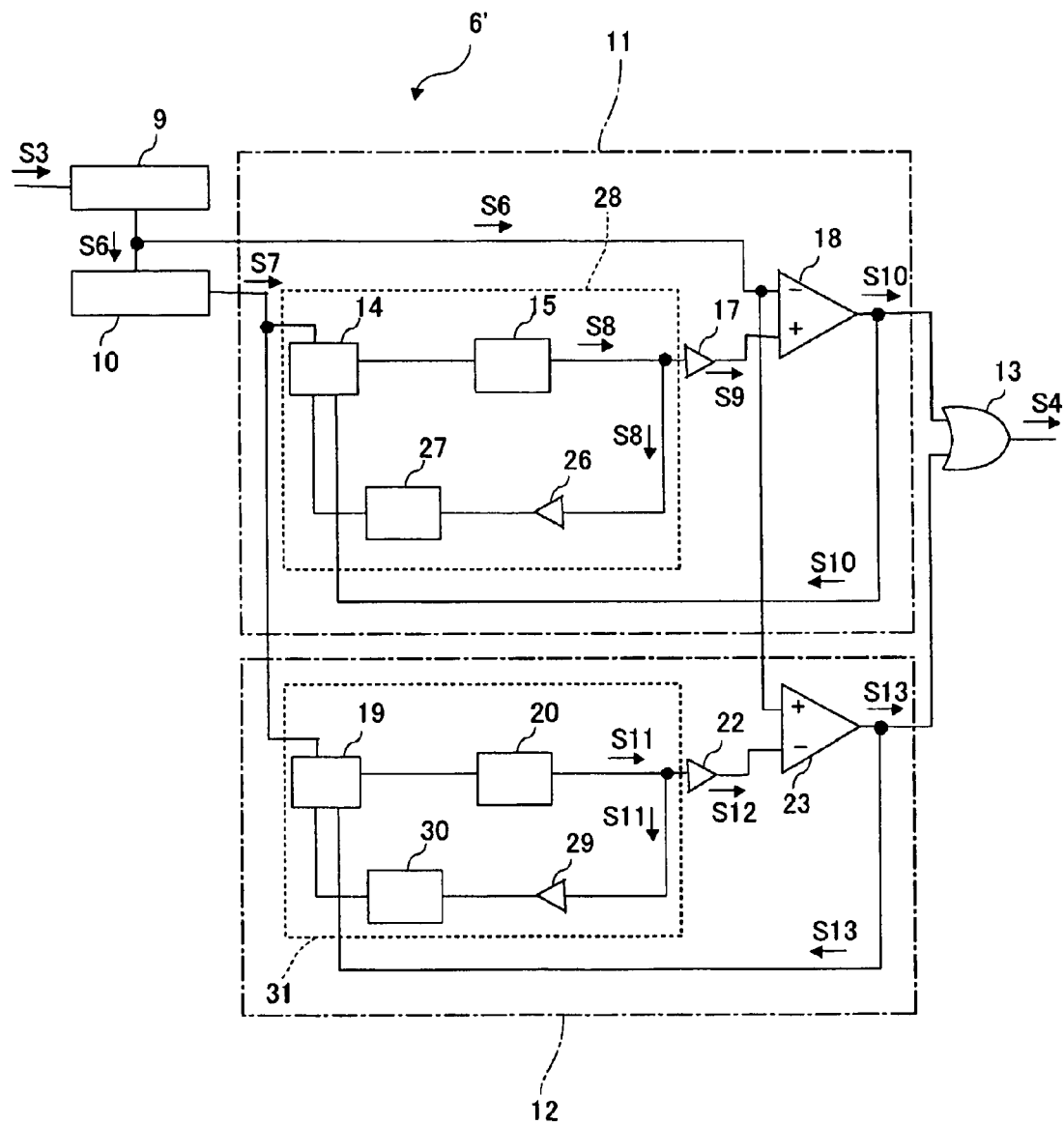
FIG. 5 is an explanatory diagram illustrating a defect-signal generating circuit according to a second embodiment.

Similarly, when detecting a bright defect, the signal level of the peak-hold signal S6 (dashed line in FIG. 4B) and the signal level of the bright-defect threshold signal S12 (solid line in FIG. 4B) are reversed in the vicinity of the end of the portion where the peak-hold signal S6 indicates occurrence of a bright defect as illustrated in FIG. 4B, and consequently, the signal level of the peak-hold signal S6 and that of the bright-defect threshold signal are not reversed before the end of a bright defect, such as a conventional bright-defect threshold signal as illustrated with a chain line in FIG. 4B.

Thus, the defect-signal generating circuit 6 can input the defect signal S4 for releasing the servo-holding state to the servo control circuit 7 at approximately the same time as neither dark defect nor bright defect being detected on the optical disk 8. Thus, when the servo-holding state is released, the servo can be controlled in a stable manner, and also data recorded in the optical disk 8 can be correctly reproduced.

Second Embodiment

With the second embodiment, description will be made regarding an example in the case in which a first adjusting circuit and a second adjusting circuit are provided as a threshold-signal adjusting circuit for adjusting the signal level of the threshold signal, an level-adding circuit for raising the signal level of the threshold signal higher than the first signal level of the threshold signal at the point of the signal level of the peak-hold signal dropping below that of the threshold signal is employed as the first adjusting circuit, and an level-subtracting circuit for reducing the signal level of the threshold signal below the second signal level of the threshold signal at the point of the signal level of the peak-hold signal going higher than that of the threshold signal is employed as the second adjusting circuit.

Note that with the following description, the same components as those in the defect-signal generating circuit 6 illustrated in FIG. 2 will be denoted with the same reference characters, and description thereof will be omitted.

A defect-signal generating circuit 6', as with the defect-signal generating circuit 6 illustrated in FIG. 2, comprises a peak-holding circuit 9, intermediate-signal generating circuit 10, dark-defect detection circuit 11, bright-defect detection circuit 12, and logical-OR computing circuit 13.

This dark-defect detection circuit 11 comprises a first adjusting circuit (hereinafter, referred to as level-adding circuit 28) made up of a dark-defect switch circuit 14, dark-defect filter circuit 15, first gain adjusting circuit 26, and first limiter circuit 27, dark-defect level-adjusting circuit 17, and dark-defect comparator 18.

Similarly, this bright-defect detection circuit 12 comprises a second adjusting circuit (hereinafter, referred to as a level-subtracting circuit 31) made up of a bright-defect switch circuit 19, bright-defect filter circuit 20, second gain adjusting circuit 29, and second limiter circuit 30, bright-defect level-adjusting circuit 22, and bright-defect comparator 23. The defect-signal generating circuit 6' thus configured generates the defect signal S4 as described below.

First, the RF signal S3 input from the defect-detection DAC 5 is input to the peak-holding circuit 9. This peak-holding circuit 9 generates the peak-hold signal S6 sensitively holding change-of-peak of the RF signal S3 input from the defect-detection DAC 5, and inputs this to the intermediate-signal generating circuit 10, dark-defect comparator 18, and bright-defect comparator 23.

Figure 6:
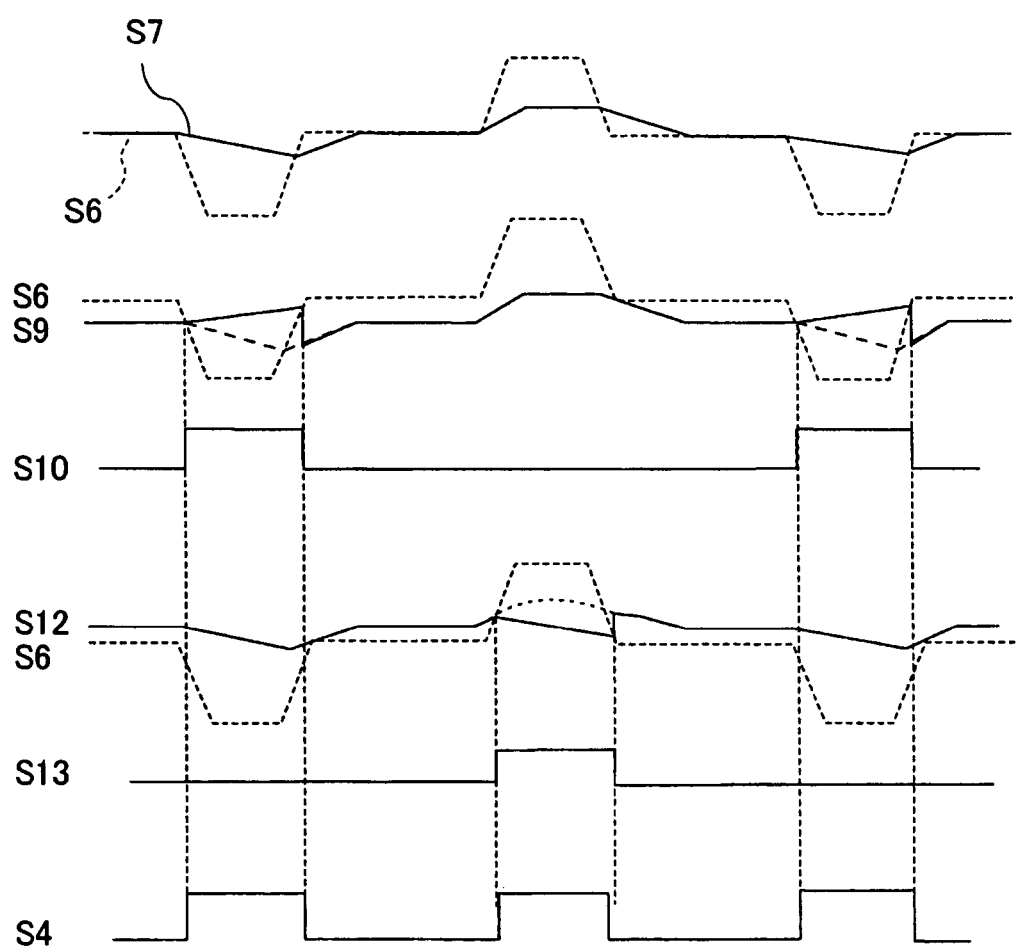
FIG. 6 is a timing chart illustrating a defect signal according to the second embodiment.

The intermediate-signal generating circuit 10 generates the intermediate signal S7 based on the peak-hold signal S6 input from the peak-holding circuit 9, and inputs this to the level-adding circuit 28 and level-subtracting circuit 23. This intermediate signal S7 is a signal holding the peak of the RF signal S3 indirectly by holding the peak of the peak-hold signal S6, and also is a signal changing with some delay following the peak-hold signal S6 changing as illustrated in FIG. 6.

The level-adding circuit 28 inputs the intermediate signal S7 to the dark-defect filter circuit 15 using the dark-defect switch circuit 14 when detecting no dark defect. On the other hand, when detecting a dark defect, the level-adding circuit 28 raises the signal level of a later-described dark-defect low-pass intermediate signal S8 using the first gain adjusting circuit 26, and sequentially inputs this dark-defect low-pass intermediate signal S8 to the dark-defect filter circuit 15 again through the dark-defect switch circuit 14.

At this time, in the event that the signal level of the dark-defect low-pass intermediate signal S8 output from the first gain adjusting circuit 26 is higher than the upper limit value set beforehand, the signal level of the dark-defect low-pass intermediate signal S8 is adjusted to the upper limit set beforehand, and then is input to the dark-defect switch circuit 14.

Also, the upper limit value to be set in the first limiter circuit should be a value in the vicinity of the signal level of the peak-hold signal S6 when detecting no dark defect and also a value lower than the signal level of the peak-hold signal S6 when detecting no dark defect.

The dark-defect filter circuit 15 generates a dark-defect low-pass intermediate signal S8 which reduces a significant change in the signal level by removing the high-frequency components of the intermediate signal S7, and inputs this to the dark-defect level-adjusting circuit 17. At this time, the dark-defect filter circuit 15 feeds back the dark-defect low-pass intermediate signal S8, and inputs this to the first gain adjusting circuit 26 at the same time.

The dark-defect level-adjusting circuit 17 generates a dark-defect threshold signal S9 (see S9 illustrated in FIG. 6) which is adjusted so that the signal level of the dark-defect low-pass intermediate signal S8 input from the dark-defect filter circuit 15 can be suppressed lower than the signal level of the peak-hold signal S6, and inputs this to the dark-defect comparator 18.

The dark-defect comparator 18 compares the signal level of the peak-hold signal S6 with that of the dark-defect threshold signal S9, generates a dark-defect signal S10 which goes to the "High" level while the signal level of the peak-hold signal S6 and that of the dark-defect threshold signal S9 are reversed, and inputs this to the logical-OR computing circuit 13. At this time, the dark-defect comparator 18 feeds back the dark-defect signal S10, and inputs this to the dark-defect switch circuit 14.

Subsequently, the dark-defect switch circuit 14 switches a signal to be input to the dark-defect filter circuit 15 based on the dark-defect signal S10 input at this time.

More specifically, the dark-defect switch circuit 14 switches a signal to be input to the dark-defect filter circuit 15 from the intermediate signal S7 to the dark-defect low-pass intermediate signal S8 at the point of starting detection of a dark defect, i.e., when the signal level of the peak-hold signal S6 falls below that of the dark-defect threshold signal S9, and the dark-defect signal S10 switches from the "Low" level to the "High" level by the signal level of the peak-hold signal S6 and that of the dark-defect threshold signal S9 being reversed.

Thus, the dark-defect low-pass intermediate signal S8, of which the signal level is raised using the first gain adjusting circuit 26, is sequentially input to the dark-defect filter circuit 15 so as not to exceed the upper limit value set in the first limiter circuit 27, and consequently, the signal level of the dark-defect threshold signal S9 serving as the output signal of the dark-defect level-adjusting circuit 17 gradually rises above the signal level of the dark-defect threshold signal S9 at the point of the signal level of the peak-hold signal S6 and that of the dark-defect threshold signal being reversed (the first signal level of the threshold signal) while the dark-defect signal S10 is at the "High" level (see S9 illustrated with the solid line in FIG. 6).

Thus, adjustment of the signal level of the dark-defect threshold signal S9 can be started at approximately the same time as the dark-defect detection circuit 11 detects a dark defect.

On the other hand, the dark-defect switch circuit 14 switches a signal to be input to the dark-defect filter circuit 15 from the dark-defect low-pass intermediate signal S8 to the intermediate signal S7 at the point of completing detection of a dark defect, i.e., at the point of the dark-defect signal S10 switching from the "High" level to the "Low" level by the signal level of the peak-hold signal S6 and that of the dark-defect threshold signal S9 being reversed again.

Accordingly, the intermediate signal S7 is input to the dark-defect filter circuit 15, the signal level of the dark-defect threshold signal S9 changes based on this intermediate signal S7, and consequently, adjustment of the signal level of the dark-defect threshold signal S9 is stopped.

Thus, adjustment of the signal level of the dark-defect threshold signal S9 is stopped at approximately the same time as the dark-defect detection circuit 11 completes detection of a dark defect.

On the other hand, the level-subtracting circuit 31 inputs the intermediate signal S7 to the bright-defect filter circuit 20 using the bright-defect switch circuit 19 when detecting no bright defect. Conversely, when detecting a bright defect, the level-subtracting circuit 31 lowers the signal level of a later-described bright-defect low-pass intermediate signal S11 using the second gain adjusting circuit 29, and sequentially inputs this bright-defect low-pass intermediate signal S11 to the bright-defect filter circuit 20 again through the bright-defect switch circuit 19.

At this time, in the event that the signal level of the bright-defect low-pass intermediate signal S11 output from the second gain adjusting circuit 29 is lower than the lower limit value set beforehand, the signal level of the bright-defect low-pass intermediate signal S11 is adjusted to the lower limit set beforehand, and then is input to the bright-defect switch circuit 19.

Also, the lower limit value to be set in the second limiter circuit should be a value in the vicinity of the signal level of the peak-hold signal S6 when detecting no bright defect and also a value higher than the signal level of the peak-hold signal S6 when detecting no bright defect.

The bright-defect filter circuit 20 generates a bright-defect low-pass intermediate signal S11 which reduces a significant change in the signal level by removing the high-frequency components of the intermediate signal S7, and inputs this to the bright-defect level-adjusting circuit 22. At this time, the bright-defect filter circuit 20 feeds back the bright-defect low-pass intermediate signal S11, and inputs this to the second gain adjusting circuit 29 at the same time.

The bright-defect level-adjusting circuit 22 generates a bright-defect threshold signal S12 (see S12 illustrated in FIG. 6) which is adjusted so that the signal level of the bright-defect low-pass intermediate signal S11 input from the bright-defect filter circuit 20 can be raised higher than the signal level of the peak-hold signal S6, and inputs this to the bright-defect comparator 23.

The bright-defect comparator 23 compares the signal level of the peak-hold signal S6 with that of the bright-defect signal S13, generates a bright-defect signal S12 which is at the "High" level while the signal level of the peak-hold signal S6 and that of the bright-defect threshold signal S12 are reversed, and inputs this to the logical-OR computing circuit 13. At this time, the bright-defect comparator 23 feeds back the bright-defect signal S13, and inputs this to the bright-defect switch circuit 19.

Subsequently, the bright-defect switch circuit 19 switches a signal to be input to the bright-defect filter circuit 20 based on the bright-defect signal S13 input at this time.

More specifically, the bright-defect switch circuit 19 switches a signal to be input to the bright-defect filter circuit 20 from the intermediate signal S7 to the bright-defect low-pass intermediate signal S11 at the point of starting detection of a bright defect, i.e., when the signal level of the peak-hold signal S6 rises above that of the bright-defect threshold signal S12, and the bright-defect signal S13 switches from the "Low" level to the "High" level by the signal level of the peak-hold signal S6 and that of the bright-defect threshold signal S12 being reversed.

Thus, the bright-defect low-pass intermediate signal S11, of which the signal level is lowered using the second gain adjusting circuit 29, is sequentially input to the bright-defect filter circuit 20 so as not to exceed the lower limit value set in the second limiter circuit 30, and consequently, the signal level of the bright-defect threshold signal S12 serving as the output signal of the bright-defect level-adjusting circuit 23 gradually drops below the signal level of the dark-defect threshold signal S9 at the point of the signal level of the peak-hold signal S6 and that of the bright-defect threshold signal S12 being reversed (the second signal level of the threshold signal) while the bright-defect signal S13 is at the "High" level (see S12 illustrated with the solid line in FIG. 6).

Thus, adjustment of the signal level of the bright-defect threshold signal S12 can be started at approximately the same time as the bright-defect detection circuit 12 detects a bright defect.

On the other hand, the bright-defect switch circuit 19 switches a signal to be input to the bright-defect filter circuit 20 from the bright-defect low-pass intermediate signal S11 to the intermediate signal S7 at the point of completing detection of a bright defect, i.e., at the point of the bright-defect signal S13 switching from the "High" level to the "Low" level by the signal level of the peak-hold signal S6 and that of the bright-defect threshold signal S12 being reversed again.

Thus, the intermediate signal S7 is input to the bright-defect filter 20, the signal level of the bright-defect threshold signal S12 changes based on this intermediate signal S7, and consequently, adjustment of the signal level of the bright-defect threshold signal S12 is stopped. Adjustment of the signal level of the bright-defect threshold signal S12 is thus stopped at approximately the same time as the bright-defect detection circuit 12 completes detection of a bright defect.

The logical-OR computing circuit 13 generates a defect signal S4 (see FIG. 6) which goes to the "High" level while detecting a dark defect and a bright defect by carrying out the logical OR operation between the dark-defect signal S10 input from the dark-defect detection circuit 11 and the bright-defect signal S13 input from the bright-defect detection circuit 12, and outputs this to the servo control circuit 7.

The servo control circuit 7 outputs the servo control signal S5 which stops operation of the servo of the optical pickup 2 so as to make the optical pickup 2 into the servo-holding state while the defect signal S4 input from the logical-OR computing circuit 13 is at the "High" level, and then outputs the servo control signal S5 which releases the servo-holding state so as to resume operation of the optical pickup 2 when the defect signal S4 returns to the "Low" level again.

Thus, the optical disk reproducing device 1 including the defect-signal generating circuit 6' according to the second embodiment raises the signal level of the dark-defect threshold signal S9 by raising the signal level of the dark-defect low-pass intermediate signal S8 using the level-adding circuit 28 while detecting a dark defect, and on the other hand, lowers the signal level of the bright-defect low-pass intermediate signal S11 using the level-subtracting circuit 31 while detecting a bright defect.

Figure 7A:
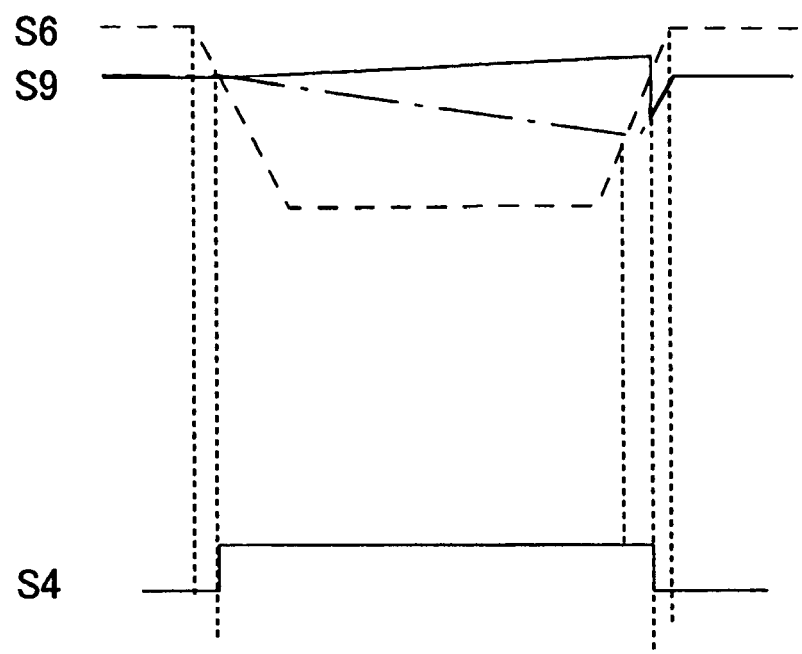
FIG. 7 is a timing chart illustrating a defect signal according to the second embodiment at the time of detecting a defect.

Accordingly, when detecting a dark defect, the signal level of the peak-hold signal S6 (dashed line in FIG. 7A) and the signal level of the dark-defect threshold signal S9 (solid line in FIG. 7A) are reversed closer to the end of the portion where the peak-hold signal S6 indicates occurrence of a dark defect than the position where the signal level of the dark-defect threshold signal in the case of no adjustment being performed (chain line in FIG. 7A) and that of the peak-hold signal S9 are reversed as illustrated in FIG. 7A, thereby changing the defect signal S4 from the "High" level to the "Low" level at approximately the same time as no dark defect is detected.

Figure 7B:
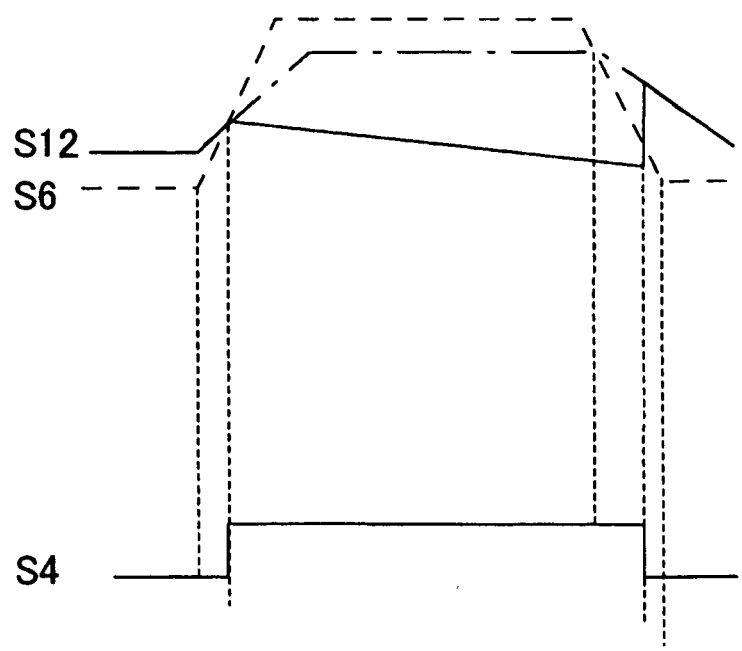

Similarly, when detecting a bright defect, the signal level of the peak-hold signal S6 (dashed line in FIG. 7B) and the signal level of the bright-defect threshold signal S12 (solid line in FIG. 7B) are reversed closer to the end of the portion where the peak-hold signal S6 indicates occurrence of a bright defect than the position where the signal level of the bright-defect threshold signal in the case of no adjustment being performed (chain line in FIG. 7B) and that of the peak-hold signal S9 are reversed as illustrated in FIG. 7B, thereby changing the defect signal S4 from the "High" level to the "Low" level at approximately the same time as no bright defect being detected.

Thus, the defect-signal generating circuit 6' can input the defect signal S4 for releasing the servo-holding state to the servo control circuit 7 at approximately the same time as neither dark defect nor bright defect being detected on the optical disk 8. Accordingly, when the servo-holding state is released, the servo can be controlled in a stable manner, and also data recorded in the optical disk 8 can be correctly reproduced.

Figure 8A:
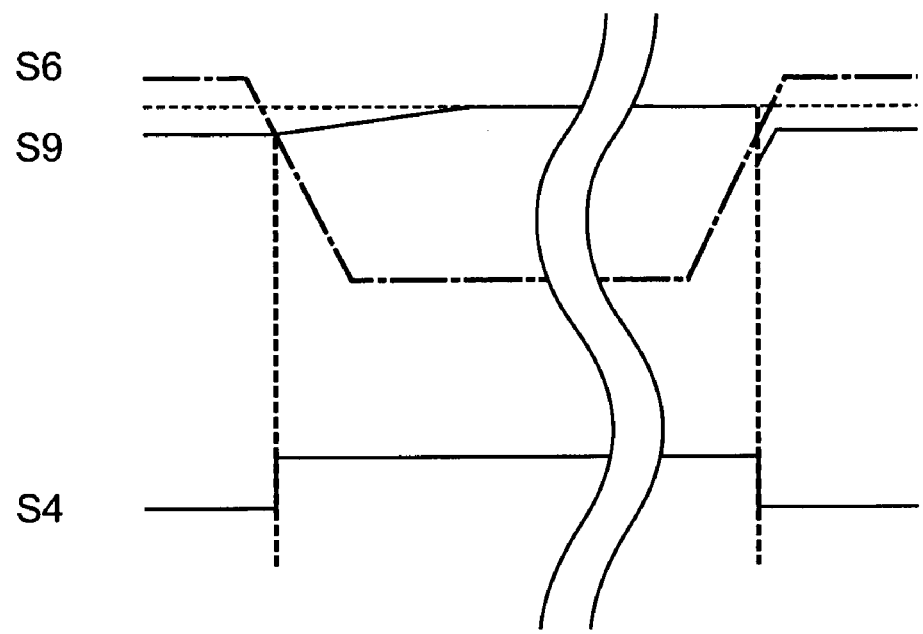
FIG. 8 is a timing chart illustrating a defect signal according to the second embodiment at the time of detecting a defect.

This defect-signal generating circuit 6' adjusts the signal level of the dark-defect low-pass intermediate signal S8 so as not to exceed the upper limit value set beforehand using the first limiter circuit even in the event of detecting a relatively-long-term dark defect, so that the signal level of the dark-defect threshold signal S9 (solid line in FIG. 8A) never rises above the signal level of the portion where a dark defect of the peak-hold signal S6 (chain line in FIG. 8A) has not been detected, as illustrated in FIG. 8A.

In other words, the signal level of the dark-defect threshold signal S9 never rises above the signal level of the normal peak-hold signal S6 all the time, thereby preventing erroneous detection of a dark defect due to the signal level of the dark-defect threshold signal S9 being raised too high.

Figure 8B:
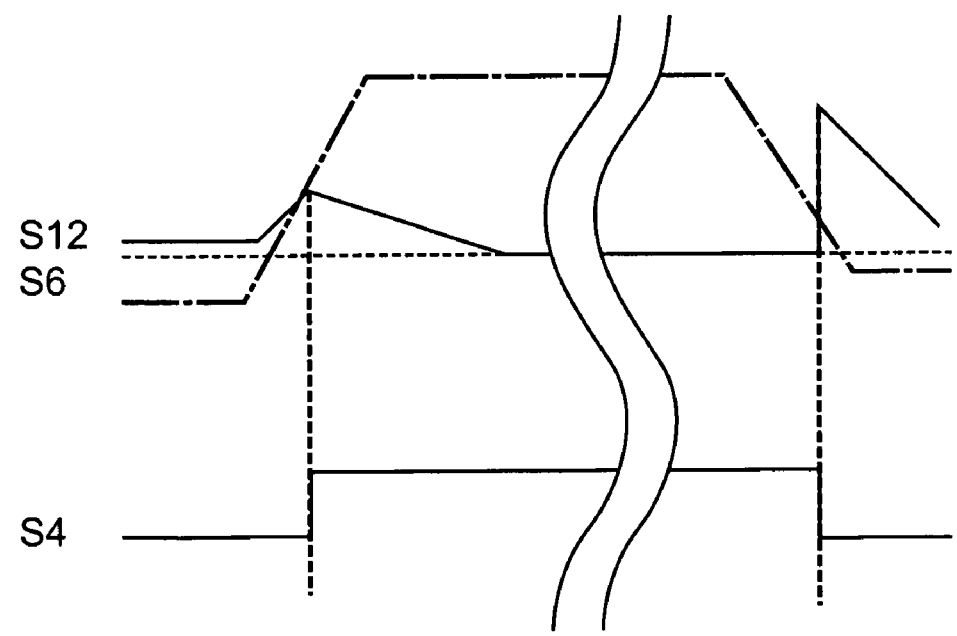
Figure 9:
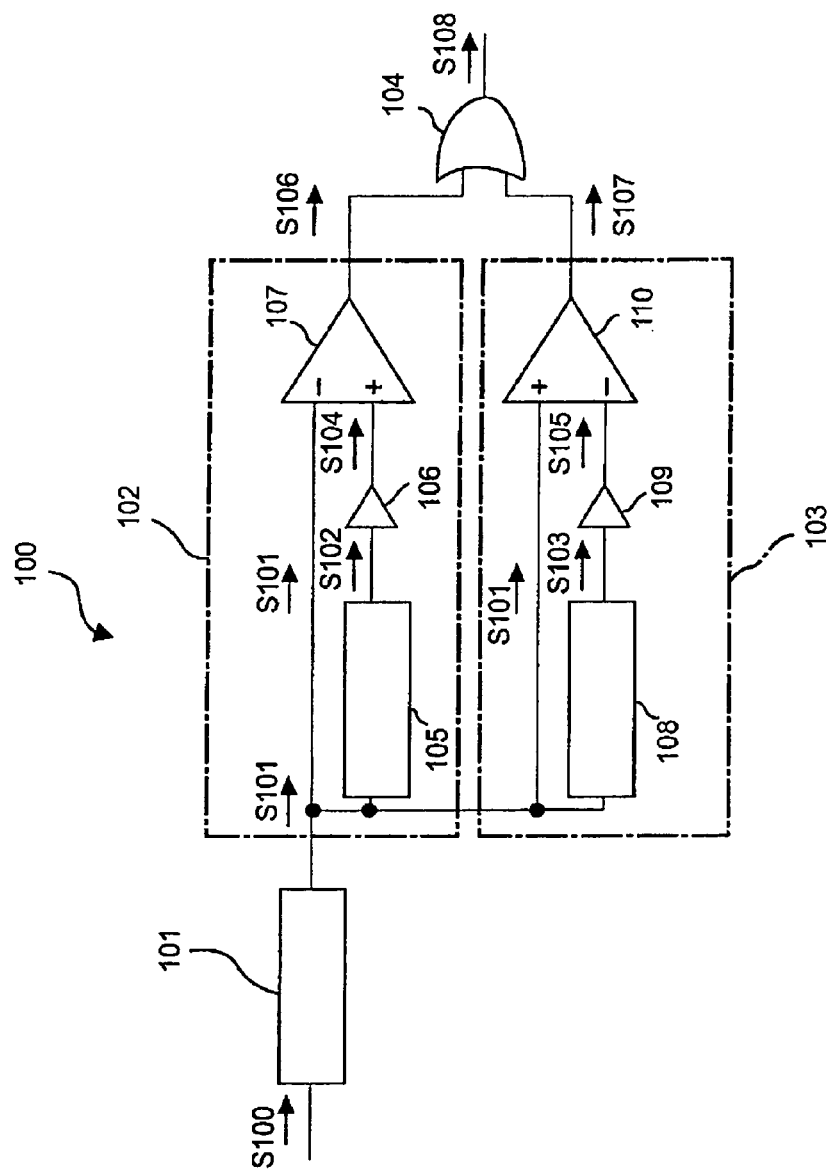
FIG. 9 is an explanatory diagram illustrating a conventional defect-signal generating circuit.
Figure 10:
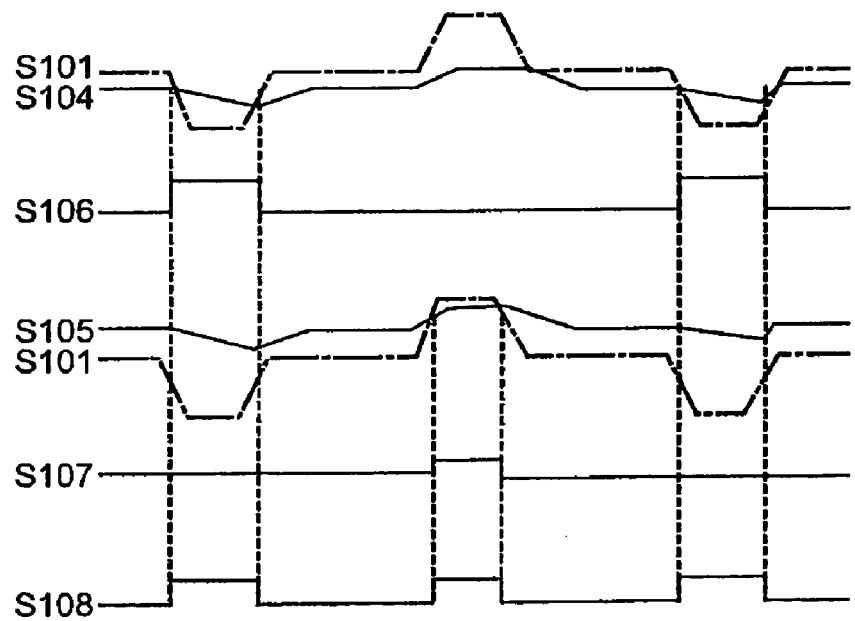
FIG. 10 is an explanatory diagram illustrating a conventional defect signal.
Figure 11A:
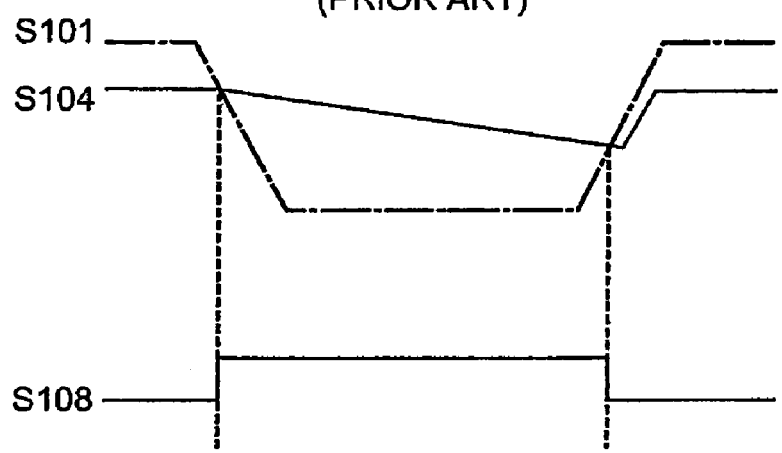
FIG. 11 is an explanatory diagram illustrating a conventional defect signal at the time of detecting a defect.
Figure 11B:
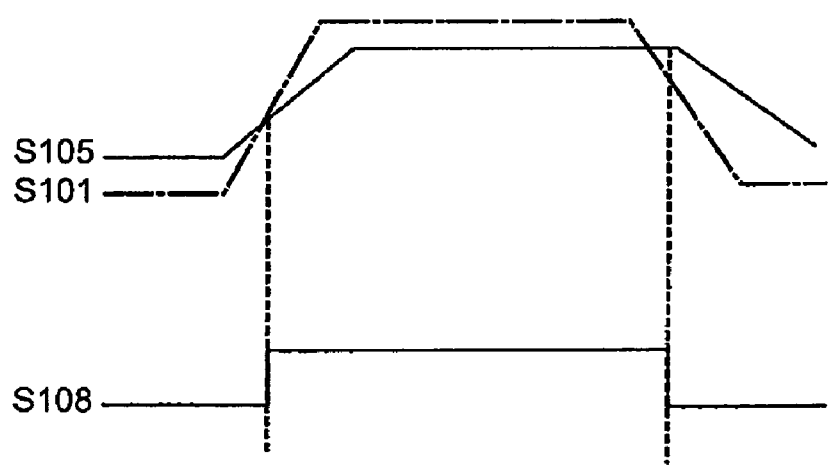

Similarly, the defect-signal generating circuit 6' adjusts the signal level of the bright-defect low-pass intermediate signal S11 so as not to exceed the lower limit value set beforehand using the second limiter circuit even in the event of detecting a relatively-long-term bright defect, so that the signal level of the bright-defect threshold signal S12 (solid line in FIG. 8B) never falls below the signal level of the portion where a bright defect of the peak-hold signal S6 (chain line in FIG. 8B) has not been detected, as illustrated in FIG. 8B.

In other words, the signal level of the bright-defect threshold signal S12 never falls below the signal level of the normal peak-hold signal S6 all the time, thereby preventing erroneous detection of a bright defect due to the signal level of the bright-defect threshold signal S12 being lowered too far.

What is claimed is:

1. A defect-signal generating circuit comprising:
   a peak-hold signal generating circuit for generating a peak-hold signal by holding the peak of an RF signal read out from a recording medium;
   an intermediate-signal generating circuit, which is a peak-holding circuit having a longer time constant than said peak-hold signal generating circuit, for generating an intermediate signal by holding the peak of said RE signal;
   a signal-level adjusting circuit for generating a threshold signal by shifting the signal level of said intermediate signal;

a threshold-signal adjusting circuit for adjusting the signal level of said threshold signal; and a comparator for generating a defect signal by comparing said peak-hold signal with said threshold signal;

wherein said threshold-signal adjusting circuit includes at least one of a first adjusting circuit for adjusting the signal level of said threshold signal in the event that the signal level of said peak-hold signal falls below that of said threshold signal, due to the signal level of said peak-hold signal and that of said threshold signal being reversed, so as to raise the signal level of said threshold signal higher than that in the case of no adjustment being performed, and a second adjusting circuit for adjusting the signal level of said threshold signal in the event that the signal level of said peak-hold signal rises above that of said threshold signal, due to the signal level of said peak-hold signal and that of said threshold signal being reversed, so as to lower the signal level of said threshold signal lower than that in the case of no adjustment being performed.

2. The defect-signal generating circuit according to claim 1, wherein said threshold-signal adjusting circuit adjusts the signal level of said threshold signal so as to retain the signal level of said threshold signal at the point of the signal level of said peak-hold signal and that of said threshold signal being reversed.

3. The defect-signal generating circuit according to claim 1, wherein upon the signal level of said peak-hold signal and that of said threshold signal being reversed, said first adjusting circuit raises the signal level of said threshold signal higher than that of a first threshold signal at the point of the signal level of said peak-hold signal falling below that of said threshold signal.

4. The defect-signal generating circuit according to claim 3, wherein said first adjusting circuit includes a first limiter for setting the upper limit of the signal level of said threshold signal.

5. The defect-signal generating circuit according to claim 1, wherein upon the signal level of said peak-hold signal and that of said threshold signal being reversed, said second adjusting circuit lowers the signal level of said threshold signal lower than that of a second threshold signal at the point of the signal level of said peak-hold signal rising higher than that of said threshold signal.

6. The defect-signal generating circuit according to claim 5, wherein said second adjusting circuit includes a second limiter for setting the lower limit of the signal level of said threshold signal.

7. The defect-signal generating circuit according to claim 1, wherein following adjusting the signal level of said threshold signal, upon the signal level of said peak-hold signal and that of said threshold signal being reversed again, said threshold-signal adjusting circuit stops adjustment of the signal level of said threshold signal.

8. The defect-signal generating circuit according to claim 1, wherein following adjusting the signal level of said threshold signal, upon a certain period elapsing, said threshold-signal adjusting circuit stops adjustment of the signal level of said threshold signal.

9. An optical disk reproducing device including a defect-signal generating circuit, said defect-signal generating circuit comprising:

a peak-hold signal generating circuit for generating a peak-hold signal by holding the peak of an RF signal read out from a recording medium;

an intermediate-signal generating circuit, which is a peak-holding circuit having a longer time constant than said peak-hold signal generating circuit, for generating an intermediate signal by holding the peak of said RF signal;

a signal-level adjusting circuit for generating a threshold signal by shifting the signal level of said intermediate signal;

a threshold-signal adjusting circuit for adjusting the signal level of said threshold signal; and a comparator for generating a defect signal by comparing said peak-hold signal with said threshold signal;

wherein said threshold-signal adjusting circuit includes at least one of a first adjusting circuit for adjusting the signal level of said threshold signal in the event that the signal level of said peak-hold signal falls below that of said threshold signal, due to the signal level of said peak-hold signal and that of said threshold signal being reversed, so as to raise the signal level of said threshold signal higher than that in the case of no adjustment being performed, and a second adjusting circuit for adjusting the signal level of said threshold signal in the event that the signal level of said peak-hold signal rises above that of said threshold signal, due to the signal level of said peak-hold signal and that of said threshold signal being reversed, so as to lower the signal level of said threshold signal lower than that in the case of no adjustment being performed.

* * * * *